United States Patent
Du et al.

(10) Patent No.: US 10,819,641 B2
(45) Date of Patent: Oct. 27, 2020

(54) HIGHLY AVAILABLE SERVERS

(71) Applicant: International Business Machines Corporation, Armonk, NY (US)

(72) Inventors: Juan Du, Cary, NC (US); Arun K. Iyengar, Yorktown Heights, NY (US); Gong Su, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 15/629,242

(22) Filed: Jun. 21, 2017

(65) Prior Publication Data

US 2017/0289044 A1    Oct. 5, 2017

Related U.S. Application Data

(63) Continuation of application No. 13/489,965, filed on Jun. 6, 2012, now Pat. No. 9,742,676.

(51) Int. Cl.
*H04L 12/803* (2013.01)
*H04L 29/14* (2006.01)
*G06F 11/20* (2006.01)

(52) U.S. Cl.
CPC ............ *H04L 47/125* (2013.01); *H04L 69/40* (2013.01)

(58) Field of Classification Search
CPC .... G06F 3/0641; G06F 3/065; G06F 11/1474; G06F 11/2025; G06F 16/275; G06F 11/006; G06F 11/2046; G06F 11/2007; G06F 11/2023; G06F 11/2097; G06F 11/2069; G06F 11/2092; G06Q 30/0601; G06Q 30/0641; H04W 12/00518

USPC ....... 709/201, 229, 248, 237, 203, 206, 228, 709/232, 238, 245; 707/610, 615; 705/26.1, 26.8, 27.1; 714/15, 4.11
See application file for complete search history.

(56) References Cited

U.S. PATENT DOCUMENTS

| | | | |
|---|---|---|---|
| 5,126,889 A * | 6/1992 | Walden | G06F 11/08 360/53 |
| 5,596,720 A * | 1/1997 | Hamada | G06F 11/1443 709/206 |
| 5,696,895 A | 12/1997 | Hemphill et al. | |

(Continued)

FOREIGN PATENT DOCUMENTS

EP    1550192 B1    11/2009

OTHER PUBLICATIONS

J. Wang et al., "An Fast Transparent Failover Scheme for Service Availability," First International Multi-Symposiums on Computer and Computational Sciences (IMSCCS), Jun. 2006, pp. 654-661.

(Continued)

*Primary Examiner* — Backhean Tiv
*Assistant Examiner* — Linh T. Nguyen
(74) *Attorney, Agent, or Firm* — Kurt Goudy; Ryan, Mason & Lewis, LLP

(57) ABSTRACT

Techniques for maintaining high availability servers are disclosed. For example, a method comprises the following steps. One or more client requests are provided to a first server for execution therein. The one or more client requests are also provided to a second server for storage therein. In response to the first server failing, the second server is configured to execute at least one client request of the one or more client requests provided to the first server and the second server that is not properly executed by the first server.

20 Claims, 3 Drawing Sheets

(56) References Cited

U.S. PATENT DOCUMENTS

| | | | |
|---|---|---|---|
| 5,774,660 A | 6/1998 | Brendel et al. | |
| 6,317,844 B1 | 11/2001 | Kleiman | |
| 6,920,579 B1 | 7/2005 | Cramer et al. | |
| 6,934,878 B2 | 8/2005 | Massa et al. | |
| 6,961,749 B1 | 11/2005 | Kleiman | |
| 7,069,325 B1* | 6/2006 | Lu | H04L 67/125 709/217 |
| 7,107,481 B2 | 9/2006 | Baba | |
| 7,113,993 B1 | 9/2006 | Cappiello et al. | |
| 7,149,922 B2 | 12/2006 | Sonoda et al. | |
| 7,178,050 B2 | 2/2007 | Fung et al. | |
| 7,340,637 B2 | 3/2008 | Nagoya | |
| 7,389,510 B1 | 6/2008 | Forrester | |
| 7,536,586 B2 | 5/2009 | Ahmadian et al. | |
| 7,647,401 B1 | 1/2010 | Collet et al. | |
| 7,685,289 B2 | 3/2010 | Burckart et al. | |
| 7,783,914 B1 | 8/2010 | Havemose | |
| 7,818,399 B1 | 10/2010 | Ross, Jr. et al. | |
| 8,159,961 B1 | 4/2012 | Rai et al. | |
| 8,219,684 B1* | 7/2012 | Dean | G06F 9/5027 709/203 |
| 8,503,288 B1* | 8/2013 | Howard | H04L 1/00 370/217 |
| 2002/0007470 A1* | 1/2002 | Kleiman | G06F 11/2035 714/6.12 |
| 2002/0032777 A1 | 3/2002 | Kawata et al. | |
| 2002/0120743 A1 | 8/2002 | Shabtay et al. | |
| 2002/0138551 A1* | 9/2002 | Erickson | H04L 29/06 709/203 |
| 2003/0005080 A1 | 1/2003 | Watkins et al. | |
| 2003/0050992 A1* | 3/2003 | Davis | G06F 9/544 709/213 |
| 2003/0163755 A1 | 8/2003 | Fung et al. | |
| 2003/0187978 A1 | 10/2003 | Nakamura et al. | |
| 2003/0204769 A1* | 10/2003 | Coughlin | H04L 29/06 714/4.12 |
| 2004/0024880 A1 | 2/2004 | Elving et al. | |
| 2004/0267876 A1* | 12/2004 | Kakivaya | H04L 67/16 709/200 |
| 2005/0125557 A1 | 6/2005 | Vasudevan et al. | |
| 2005/0204045 A1* | 9/2005 | Belkin | G06F 9/5027 709/227 |
| 2005/0261985 A1* | 11/2005 | Miller | G06Q 10/00 709/223 |
| 2006/0085425 A1 | 4/2006 | Lauer et al. | |
| 2006/0168334 A1 | 7/2006 | Potti et al. | |
| 2006/0259733 A1 | 11/2006 | Yamazaki et al. | |
| 2007/0124477 A1 | 5/2007 | Martin | |
| 2007/0220155 A1* | 9/2007 | Nalla | H04L 67/141 709/227 |
| 2007/0245352 A1* | 10/2007 | Ma | G06F 9/5038 718/105 |
| 2007/0299973 A1* | 12/2007 | Borgendale | G06F 15/16 709/227 |
| 2008/0104607 A1 | 5/2008 | Baker | |
| 2008/0147870 A1 | 6/2008 | Tomono | |
| 2008/0168139 A1 | 7/2008 | Junuzovic et al. | |
| 2009/0077233 A1 | 3/2009 | Kurebayashi et al. | |
| 2009/0193243 A1 | 7/2009 | Ely | |
| 2009/0198573 A1* | 8/2009 | Fox | A63F 13/10 705/14.5 |
| 2009/0265467 A1 | 10/2009 | Peles | |
| 2009/0319600 A1 | 12/2009 | Sedan et al. | |
| 2010/0030880 A1 | 2/2010 | Joshi et al. | |
| 2010/0042675 A1 | 2/2010 | Fujii | |
| 2010/0185728 A1 | 7/2010 | Erickson | |
| 2011/0138037 A1 | 6/2011 | Sharma et al. | |
| 2011/0212783 A1 | 9/2011 | Dale et al. | |
| 2011/0302237 A1 | 12/2011 | Knight et al. | |
| 2012/0173919 A1* | 7/2012 | Patel | G06F 11/20 714/4.11 |
| 2013/0054822 A1* | 2/2013 | Mordani | H04L 67/1034 709/228 |
| 2013/0287024 A1* | 10/2013 | Herberg | H04L 47/323 370/392 |
| 2013/0290249 A1* | 10/2013 | Merriman | G06F 16/273 707/610 |

OTHER PUBLICATIONS

C.T. Karamanolis et al., "Configurable Highly Available Distributed Services," IEEE 14th Symposium on Reliable Distributed Systems, Sep. 1995, pp. 118-127, Bad Neuenhar, Germany.

D.M. Dias et al., "A Scalable and Highly Available Web Server," IEEE International Computer Conference (Compcon), Feb. 1996, pp. 85-92.

S.M. Baker et al., "Distributed Cooperative Web Servers*," 8th International World Wide Web Conference, May 1999, pp. 137-151, Toronto, Canada.

R. Vingralek et al., "Web++: A System for Fast and Reliable Web Service," USENIX Annual Technical Conference, Jun. 1999, pp. 171-184.

LINUX Virtual Server, http://www.linuxvirtualserver.org, Feb. 2011, 2 pages.

G. Shenoy et al., "Hydranet-FT: Network Support for Dependable Services," IEEE 20th International Conference on Distributed Computing Systems(ICDCS), Apr. 2000, pp. 699-706, Taipei, Taiwan.

N. Aghdaie et al., "Implementation and Evaluation of Transparent Fault-Tolerant Web Service with Kernel-Level Support," IEEE International Conference on Computer Communications and Networks (ICCCN), Oct. 2002, pp. 63-68.

* cited by examiner

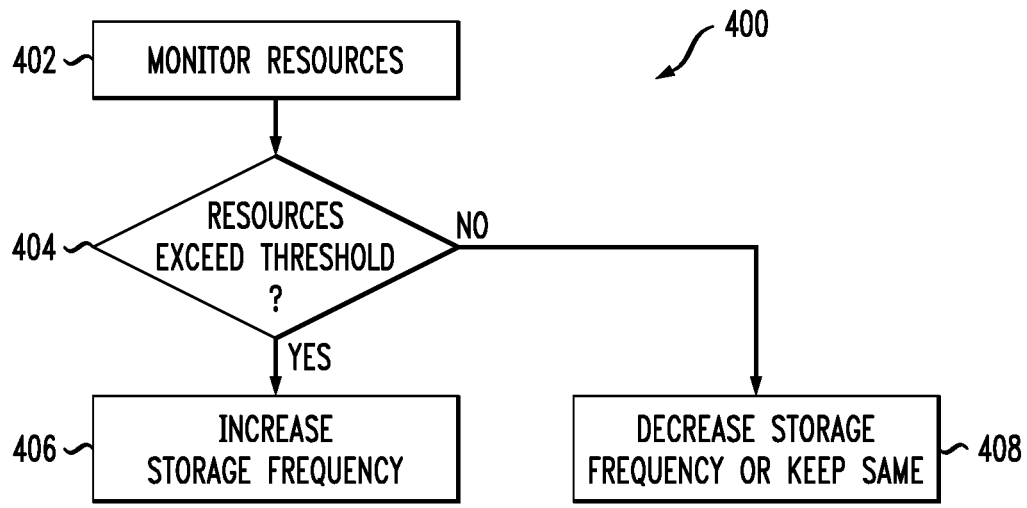
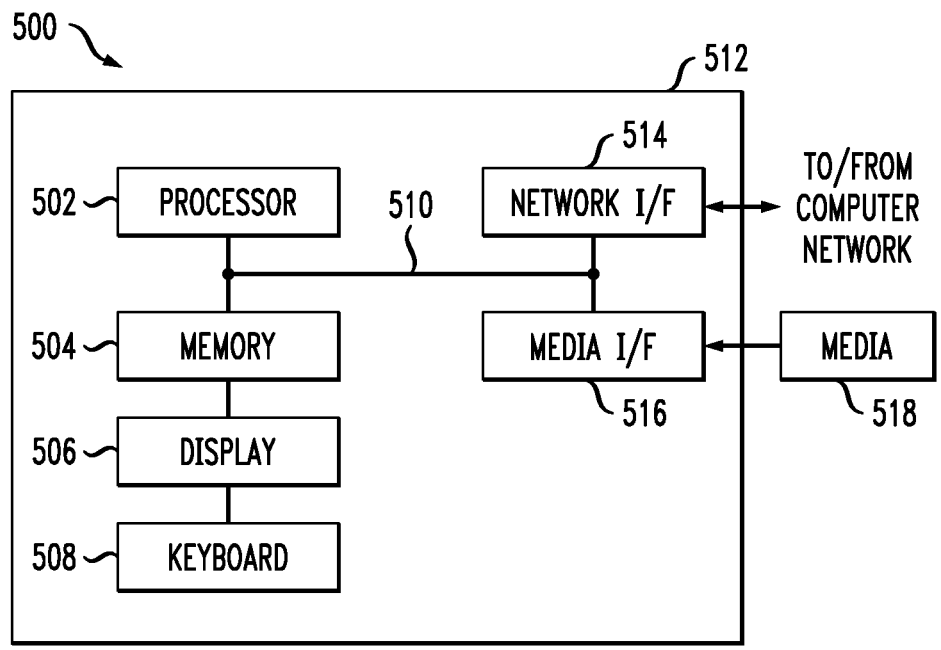

HIGHLY AVAILABLE SERVERS

CROSS-REFERENCE TO RELATED APPLICATION

This application is a continuation of U.S. patent application Ser. No. 13/489,965, filed on Jun. 6, 2012, the disclosure of which is incorporated herein by reference.

FIELD

The field relates to data processing systems and, more particularly, to highly available servers in such data processing systems.

BACKGROUND

One example of a server in a data processing system is a web server. A web server is a computing element that is accessible over the Internet and that responds to requests received from client devices. By way of one example, a web server may host a website and respond to a client request by serving one or more web pages to the client. In another example, a web server may be part of a data center that provides processing and/or storing services to a client, and thus responds to client requests associated with such services.

Clients typically desire their requests to be processed and responded to in an expeditious manner. However, when one or more web servers fail, response time to pending requests, as well as new ones, can be adversely affected.

SUMMARY

Embodiments of the invention provide techniques for maintaining high availability servers.

For example, in one embodiment, a method comprises the following steps. One or more client requests are provided to a first server for execution therein. The one or more client requests are also provided to a second server for storage therein. In response to the first server failing, the second server is configured to execute at least one client request of the one or more client requests provided to the first server and the second server that is not properly executed by the first server.

In another embodiment, a system comprises a memory and a processor device operatively coupled to the memory. The processor device and the memory are configured to perform the steps of the above method.

In yet another embodiment, an article of manufacture comprises a computer readable storage medium for storing computer readable program code which, when executed, causes a computer to perform the steps of the above method.

In a further embodiment, in a system comprised of at least one client sending requests to a cluster of servers wherein the cluster of servers is comprised of at least two servers, a method for processing requests comprises the following steps. A first server of the cluster of servers receives a plurality of requests from the at least one client and attempts to execute each request of the plurality of requests. A second server of the cluster of servers receives the plurality of requests and stores the plurality of requests. In response to the first server failing, the second server executes at least one request of the plurality of requests received by the first server and the second server but not properly executed by the first server.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 illustrates a methodology for changing a frequency for storing state information, according to an embodiment of the invention.

FIG. 5 illustrates a computing architecture of a server, according to an embodiment of the invention.

DETAILED DESCRIPTION

Figure 1:
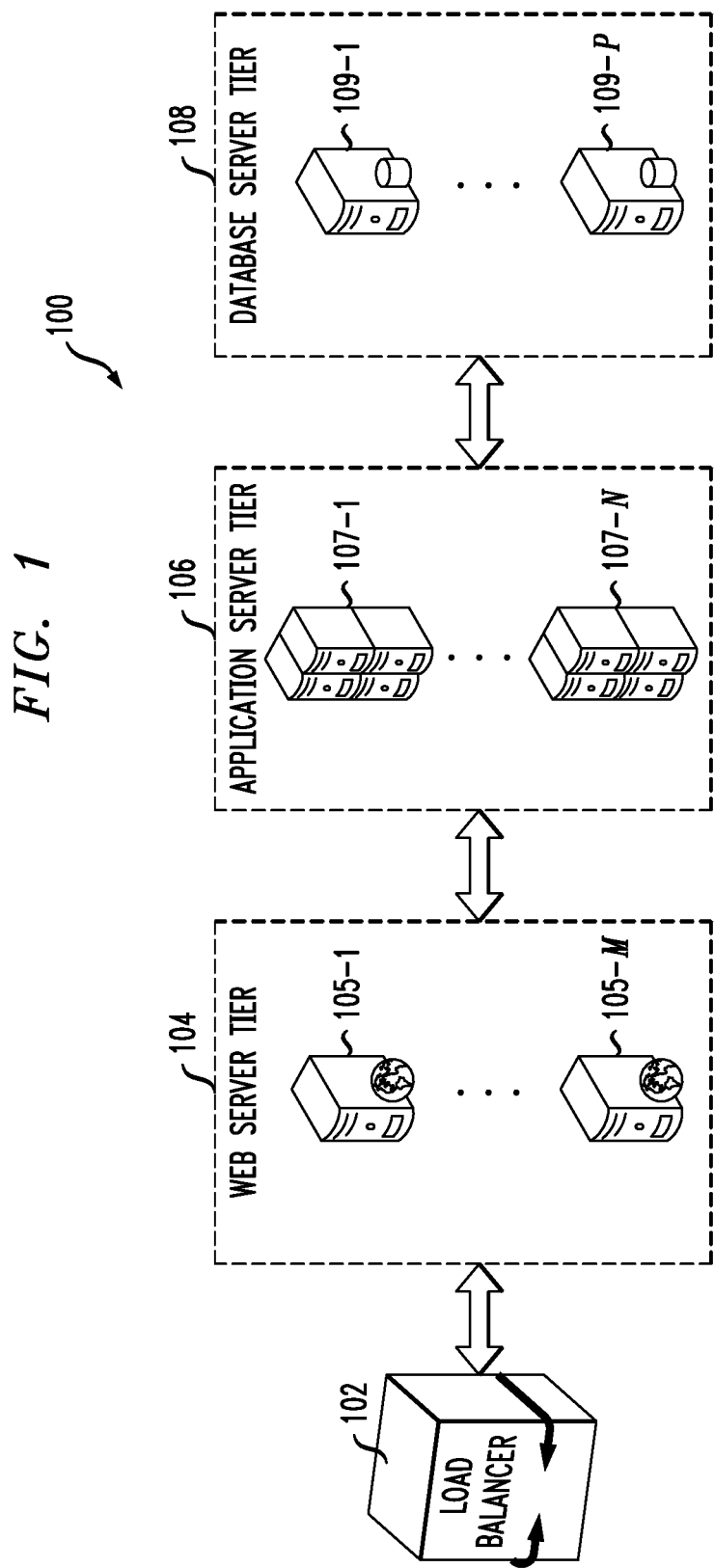
FIG. 1 illustrates a multi-tier web service architecture in accordance with which one or more embodiments of the invention may be implemented.

Illustrative embodiments of the invention will be described herein in the context of web server-based data processing systems. However, it is to be appreciated that embodiments of the invention are not intended to be limited to web server-based data processing systems but are more generally applicable to any data processing system that would benefit from the use of high availability servers.

As will be evident from the detailed description herein, embodiments of the invention provide high availability for web servers that satisfy at least two constraints:

1) The failure of the web server is transparent to the client. Many existing solutions provide ways to detect web server failure and reroute future requests to a backup server. The problem with these existing solutions is that requests that are in-progress at the time of the failure are lost. Therefore, the client may never receive a reply for the in-progress requests and has no way to determine whether those requests have been processed or not.

2) The computing resource requirement for achieving the high availability is not doubled. There are existing solutions that provide client transparent server failure. However, these solutions require a standby backup server that does not independently process requests on its own. Essentially, the high availability is achieved through doubling the amount of computing resources required.

Embodiments of the invention provide for two (or more) web servers "backing up" each other. This means that during normal operation, a request is sent to both servers. However, only one of the servers will process the request; the other simply logs the request. The role of the two servers is symmetric. Each will be processing requests, while keeping a log of requests processed by the other. Note that this "backing up" of each other approach is not limited to two servers. For example, if there are three servers, A, B, and C, one request will be sent to A and B where A processes it and B logs it; the next request will be sent to B and C where B processes it and C logs it; the next request will be sent to C and A where C processes it and A logs it, and so on. Effectively, B is backing up A, C is backing up B, and A is backing up C.

Since each request has two copies, when one server fails, all the in-progress requests can be re-processed by the backup server that has a log of the in-progress requests. Therefore, embodiments of the invention serve to shield the client from the server failure. It is also evident that, in accordance with embodiments of the invention, each server processes requests as usual rather than merely serving as a standby. That is, each server is configured to process requests during normal operations of the data processing system, and assumes the additional task of serving as a backup to another server when that other server fails. Therefore, the high availability is achieved without requiring additional computing resources.

Embodiments of the invention assume a standard multi-tiered web service architecture (i.e., web server, application server, and database server) with a front-end load balancer, which is widely used in practice. However, embodiments of the invention focus on the web server high availability. Therefore, only the front-end load balancer and the web servers are relevant and discussed. The application server and database server are therefore only mentioned below when necessary for the sake of further clarity.

For the sake of reference, however, FIG. 1 depicts a multi-tier web service architecture in accordance with which one or more embodiments of the invention may be implemented. As shown, architecture 100 comprises a load balancer 102, a web server tier 104 with a plurality of web servers 105-1 through 105-M, an application server tier 106 with a plurality of application servers 107-1 through 107-N, and a database server tier 108 with a plurality of database servers 109-1 through 109-P.

Figure 2:
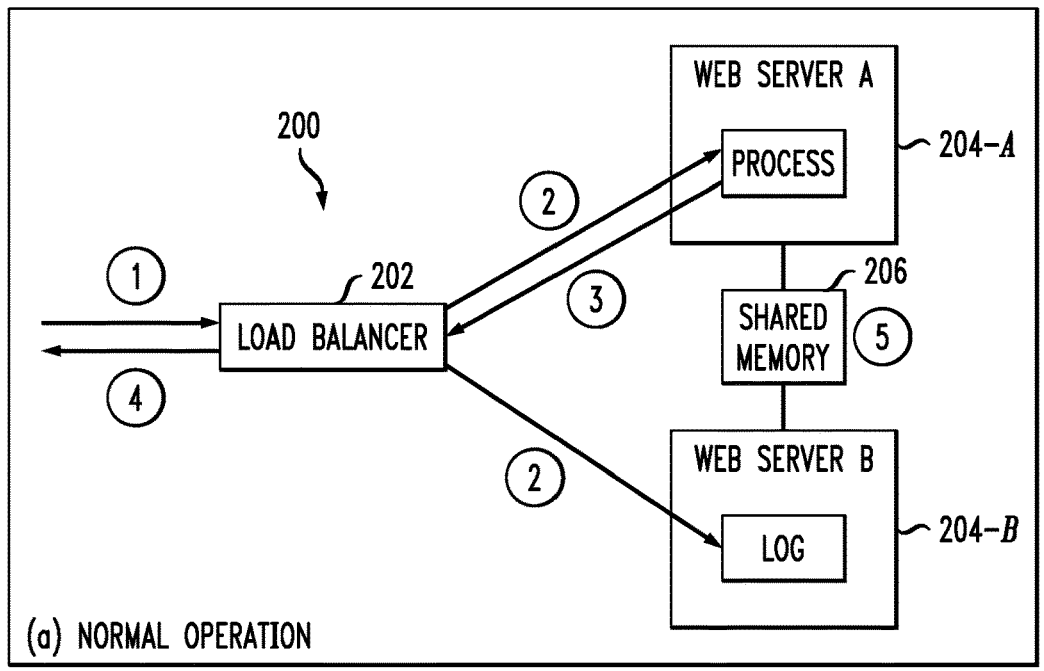
FIG. 2 illustrates a data processing system in a normal operation mode, according to an embodiment of the invention.
Figure 3:
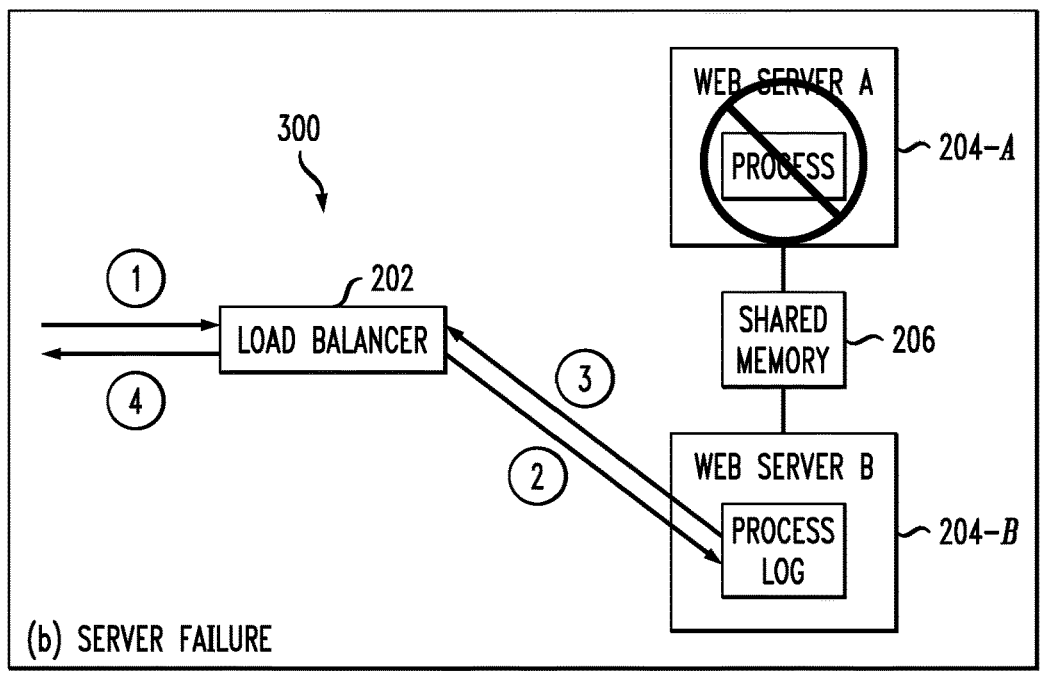
FIG. 3 illustrates a data processing system in a server failure operation mode, according to an embodiment of the invention.

FIGS. 2 and 3 respectively illustrate a data processing system in a normal operation mode 200 and a server failure (failover) operation mode 300, according to embodiments of the invention. The figures depict two web servers to illustrate the high availability serving concept with the understanding that the concept places no limit on the number of web servers. Further, the operation modes are explained by following the processing steps of an incoming client request. By way of example only, the client request could be a web request, e.g., access an http (Hypertext Transport Protocol) page, a dynamic web page request executing a server program, a search request, provide authentication information, make a purchase, add an item to a shopping cart, remove an item from a shopping cart, submit information from an HTML (Hypertext Markup Language) form, etc.

More specifically, the figures illustrate a load balancer 202 operatively coupled to web servers 204-A and 204-B. Web servers 204-A and 204-B are operatively coupled to a shared memory 206. The components shown in the figures may be operatively coupled via wireless connectivity, wired connectivity, or some combination thereof.

In step 1 of FIG. 2, load balancer 202 receives the request from a client server (not expressly shown). Upon receiving the request from the client device, load balancer 202 assigns a monotonically increasing sequence number to the request. Sequence numbers are an example of identifiers assigned to requests. Other types of identifiers can also be assigned to requests within the spirit and scope of embodiments of the invention.

Load balancer 202 also assigns a designated web server to handle the request, in this example, web server 204-A. In step 2 of FIG. 2, load balancer 202 then forwards the request to both web servers 204-A and 204-B. It is preferable if web servers 204-A and 204-B receive requests in the same order. For example, if three requests (e.g., r1, r2 and r3) are received by load balancer 202, then it is preferred that web server 204-B receives them from load balancer 202 (e.g., order: r2, r3, r1) in the same order that web server 204-A receives them from load balancer 202 (e.g., order: r2, r3, r1). There are multiple ways this can be achieved. For example, the data processing system can guarantee that web servers 204-A and 204-B will receive requests in the same order. If web servers 204-A and 204-B are not guaranteed to receive requests in the same order, then web server 204-B will subsequently have to do more work to determine that it executes the correct requests in order to handle a failure of web server 204-A.

Upon receiving a request from load balancer 202, web server 204-A processes the request and, as illustrated by step 3 in FIG. 2, sends the reply back to load balancer 202 if it is the designated one chosen by load balancer 202. Web server 204-B simply logs the request without doing anything further (i.e., without processing the request). Note that if the processing of the request results in multiple messages to be sent to an application server (not expressly shown) and each message to the application server may result in multiple messages to be sent to a database server (not expressly shown), the situation is slightly more involved and will be discussed in more details below.

Along with the reply, web server 204-A sends back to load balancer 202 information (e.g. the sequence number) identifying the request. It is preferable if load balancer 202 sends an acknowledgement to web server 204-A that the reply has been successfully received.

Upon receiving a reply from web server 204-A, load balancer 202 checks whether the reply has already been sent back to the client device using the monotonically increasing sequence number. If not, as illustrated by step 4 of FIG. 2, load balancer 202 forwards the reply back to the client device. Otherwise, load balancer 202 drops the reply.

As depicted by step 5 in FIG. 2, the states associated with processing the request are stored in shared memory 206 accessible by both web server 204-A and 204-B. One example of shared memory is a coupling facility. As is known, in mainframe computers available from IBM Corporation (Armonk, N.Y.), a coupling facility is a computer element (e.g., computer hardware) which allows multiple processors to access the same data. Other types of shared memory may also be used within the spirit and scope of embodiments of the invention.

Shared memory 206 provides two major functions. During normal processing, when designated web server 204-A has finished processing a request and sent the reply back to load balancer 202, the sequence number of the latest processed request is made known to the other server, i.e., web server 204-B, so that it can discard in its log all the requests with a lower sequence number. During failover processing, states of a failed server, i.e., web server 204-A, are immediately available to the non-failed (live) server, i.e., web server 204-B.

As illustrated in FIG. 3, if the designated server, i.e., web server 204-A, fails at some point, all its in-progress requests will be lost. Failure of a server can be detected by multiple methods. For example, the data processing system could determine that the server is not responsive. In some high availability approaches, periodic heart beat messages are exchanged between servers. If a server is failing to send and/or acknowledge heart beat messages for some amount of time, the unresponsive server is assumed to have failed.

However, advantageously, all of the in-progress requests have a second copy logged in the other server, i.e., web server 204-B. Once the failure of web server 204-A is detected, web server 204-B starts processing its log on behalf of web server 204-A. Some requests in the log may have already been processed by web server 204-A before the sequence number is updated in shared memory 206. So processing these requests will result in duplicated replies being sent back to load balancer 202. However, since load balancer 202 keeps track of which replies have already been sent back to the client device, the duplicated replies are dropped. Processing these requests may also result in duplicated messages being sent to the application and/or database server. It is preferable if an application and/or database server receiving a message from web server 204-A sends an acknowledgement to web server 204-A that the message has been successfully received. However, same as load balancer 202, the monotonically increasing sequence number allows the application and database servers to detect and drop duplicated messages.

Also depicted in the failover operation of FIG. 3, upon becoming aware that web server 204-A has failed, load balancer 202 (in step 2) sends to web server 204-B one or more requests received (in step 1) from a client device. Web server 204-B processes the one or more requests and sends back one or more replies (in step 3) to load balancer 202, which then sends the one or more replies on to the client device (in step 4).

For the case where processing a single request by the web server may result in multiple messages to the application server, additional issues arise and can be handled as follows.

If web server 204-A fails in the middle of sending multiple messages to the application server, a question arises as to how web server 204-B would know where to continue, i.e., which messages have been sent and which ones have not been sent. Similarly, a question arises as to how the application server would handle this situation, i.e., which messages have been received and which ones have not been received.

This situation is handled by a hierarchical sequence number mechanism. Basically, each tier assigns a monotonically increasing sequence number to the messages it sends, and appends it to the sequence number of the previous tier. We illustrate the concept with an example as follows.

As indicated above, when load balancer 102 sends requests to the web servers 104-A and 104-B, it assigns a monotonically increasing sequence number 1, 2, 3, . . . n to the requests. Sequence numbers are an example of identifiers assigned to requests. Other types of identifiers can also be assigned to requests within the spirit and scope of embodiments of the invention.

Now let's assume that processing request number 1, 2, and 3 results in one, two, and three messages to the application server, respectively. The web server would number the messages to the application server, for example, as follows:

The one message of request number 1 would be numbered as 1.1

The two messages of request number 2 would be numbered as 2.1 and 2.2

The three messages of request number 3 would be numbered as 3.1, 3.2, and 3.3

To see how this hierarchical sequence number mechanism helps in failover, let us first point out that since shared memory 206 is typically slower than local memory (i.e., memory resident on the web server), there is a trade-off between how often a web server updates its states in the shared memory and the amount of requests that need to be re-processed and messages that need to be re-sent during failover. For example, a web server can update its states in the shared memory in several different frequencies, for examples, as follows:

after sending every message, i.e., an update after sending 1.1, an update after sending 2.1, and an update after sending 2.2, etc.

after sending all the messages of a request, i.e., an update after sending 1.1, and an update after sending 2.1 and 2.2, etc.

after sending all the messages of several requests, i.e., an update after sending 1.1 through 3.3, etc.

Clearly, the higher the update frequency, the fewer requests need to be re-processed and the fewer messages need to be re-sent. Note that making an update after sending every message (the first case above) can result in a partial state of processing a request, which is detrimental to the failover. Because when a live web server takes over a failed one, it typically does not know how to "partially" process a request based on a partial state. Therefore, it is preferred that during normal operation, a web server does not leave partial states in the shared memory. This is accomplished by setting the web server's state updating frequency to be at most once for every request handled (the second case above).

The frequency with which the web server updates state in shared memory can be adjusted dynamically to balance normal processing overhead and recovery overhead. When it is desirable to minimize normal processing overhead, a web server should update its state in shared memory relatively infrequently. When it is desirable to minimize recovery overhead, the web server should update its state in shared memory more frequently. A threshold for available computing resources (e.g., CPU resources and/or I/O bandwidth between the web server and shared memory) can be specified. When the available computing resources are above the threshold, the web server can update its state more frequently. When the available computing resources are below the threshold, the web server can update its state less frequently.

FIG. 4 illustrates a methodology for changing a frequency for storing state information, according to an embodiment of the invention. More particularly, FIG. 4 depicts a methodology 400 for modifying a frequency with which a web server updates state in shared memory.

As shown, in step 402, the system monitors resources required for storing state in shared memory, such as CPU resources and/or I/O bandwidth between a web server and a shared memory. If the available resources exceed a threshold ("Yes" answer to step 404), the web server stores state information in the shared memory more frequently (step 406). If the answer to step 404 is "No," the frequency with which the web server stores state information in the shared memory is unchanged if the available resources equal the threshold. The frequency with which the web server stores state information in the shared memory is decreased if the available resources fall below the threshold. The keep same/decrease scenarios are shown as step 408.

Now assume that web server 204-A fails during the processing of request number 3 and after sending message 3.2. And further assume that web server 204-A updates its states in shared memory 206 once for every request handled. When web server 204-B takes over, the states in the shared memory will indicate that web server 204-A have processed request number 2 since web server 204-A did not get a chance to update its states to request number 3 when it failed in the middle of processing it. Therefore, web server 204-B will re-process request number 3 and send out messages 3.1, 3.2, and 3.3.

When the application server receives messages 3.1, 3.2, and 3.3, the hierarchical sequence number allows it to detect that messages 3.1 and 3.2 are duplicates, sent once by web server 204-A before it failed and twice by web server 204-B after it takes over. Therefore, the application server ignores messages 3.1 and 3.2, and only processes message 3.3 from web server 204-B.

Although we do not specifically discuss application and database server high-availability in descriptions of embodiments of the invention, those skilled in the art will have no difficulty in appreciating that the messages from the application server to the database server are numbered in a similar fashion. For example, assume the application server sends two messages to the database server after processing message number 1.1, then the two messages would be numbered as 1.1.1 and 1.1.2. Further, a mechanism that is the same as or similar to the mechanism used by the application server to detect and drop duplicated messages described above would also apply to the database server. In fact, the hierarchical sequence number mechanism applies to not just the standard 3-tier web architecture, but also to architectures of any number of tiers.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-4, the diagrams in the figures illustrate the architecture, functionality, and operations of possible implementations of systems, methods and computer program products according to various embodiments of the present invention. In this regard, each block in a flowchart or a block diagram may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, embodiments of the invention, for example, as depicted in FIGS. 1-4, can also include, as described herein, providing a system, wherein the system includes distinct modules (e.g., modules comprising software, hardware or software and hardware). By way of example only, the modules may include, but are not limited to, the various components shown and described in the context of FIGS. 1-4. These and other modules may be configured, for example, to perform the steps described and illustrated in the context of FIGS. 1-4.

One or more embodiments can make use of software running on a general purpose computer or workstation. With reference to FIG. 5, such an implementation 500 employs, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to optionally include, for example, one or more mechanisms for inputting data to the processing unit (for example, keyboard or mouse), and one or more mechanisms for providing results associated with the processing unit (for example, display or printer).

The processor 502, memory 504, and input/output interface such as display 506 and keyboard 508 can be interconnected, for example, via bus 510 as part of a data processing unit 512. Suitable interconnections, for example, via bus 510, can also be provided to a network interface 514, such as a network card, which can be provided to interface with a computer network, and to a media interface 516, such as a diskette or CD-ROM drive, which can be provided to interface with media 518.

A data processing system suitable for storing and/or executing program code can include at least one processor 502 coupled directly or indirectly to memory elements 504 through a system bus 510. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 508 for making data entries; display 506 for viewing data; pointing device for selecting data; and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As referred to herein, a server may, for example, include a physical data processing system (for example, system 512 as shown in FIG. 5) running a server program. It will be understood that such a physical server may or may not include a display and keyboard. Further, it is to be understood that the components shown in FIGS. 1-4 may be implemented on one server or on more than one server. The servers may also, for example, be implemented in a distributed virtual infrastructure comprising a plurality of virtual machines.

Note that the computing architecture shown in FIG. 5 can be used to implement each web server, load balancer, client device, application server, and database server in a data processing system formed in accordance with one or more embodiments of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   assigning an identifier to each of a plurality of client requests, wherein the plurality of client requests comprises two or more client requests from a given client device, wherein individual ones of the two or more client requests from the given client device are assigned different identifiers;
   providing the plurality of client requests to a first server for execution therein;
   providing the plurality of client requests to a second server for storage therein before failure of the first server;
   receiving at least one reply corresponding to each of the plurality of client requests executed by the first server and the second server, wherein each reply comprises the identifier assigned to its corresponding client request, and wherein the ones of the plurality of client requests executed by the first server and the second server are periodically identified by updating a current identifier stored in a shared memory shared between the first server and the second server;
   wherein, in response to the first server failing, the second server is configured to execute at least one of the plurality of client requests that has not been executed by the first server, the at least one client request being determined based on the current identifier stored in the shared memory; and
   wherein receiving the at least one reply comprises, for a given one of the plurality of client requests:
      receiving a first reply comprising a given identifier from the first server sent prior to the first server failing;
      receiving a second reply comprising the given identifier from the second server subsequent to the first server failing;

providing a first one of the first reply and the second reply to a source client device that is a source of the given client request;

identifying a second one of the first reply and the second reply as a redundant reply based on the given identifier; and refraining from providing the second one of the first reply and the second reply to the source client device.

2. The method of claim 1, wherein each of the one or more client requests is sent from one of a plurality of client devices, the plurality of client devices comprising the given client device.

3. The method of claim 1, further comprising using the one or more identifiers to keep track of which of the one or more client requests have resulted in replies sent to one or more of the plurality of client devices which sent the one or more client requests.

4. The method of claim 3, further comprising in response to receiving a reply corresponding to a request of the one or more client requests which has not resulted in a reply sent to a client device which sent the client request, sending the reply to the client device which sent the client request.

5. The method of claim 1, wherein the shared memory comprises a coupling facility.

6. The method of claim 1, further comprising varying a frequency associated with periodically updating the sequence number stored in the shared memory in response to available processing power.

7. The method of claim 1, wherein executing each client request comprises sending one or more messages, and wherein the identifier stored in the shared memory is periodically updated after each message in a corresponding client request is sent.

8. The method of claim 1, wherein executing each client request comprises sending one or more messages, and wherein the identifier stored in the shared memory is periodically updated after all messages in a corresponding client request are sent.

9. The method of claim 1, wherein executing each client request comprises sending one or more messages, and wherein the identifier stored in the shared memory is periodically updated after all of the messages in two or more client requests are sent.

10. An article of manufacture comprising a non-transitory computer readable storage medium for storing computer readable program code which, when executed, causes a computer to perform the method of claim 1.

11. An apparatus comprising a memory and a processor device operatively coupled to the memory and configured to perform the method of claim 1.

12. A method comprising:
a first server of a cluster of servers receiving a plurality of client requests and attempting to execute each client request of the plurality of requests, wherein each of a plurality of client requests is assigned an identifier, wherein the plurality of client requests comprising two or more client requests from a given client device, wherein individual ones of the two or more client requests from the given client device are assigned different identifiers;

a second server of the cluster of servers receiving the plurality of client requests and storing the plurality of client requests before failure of the first server;

at least one of the first server and the second server sending at least one reply corresponding to each of the plurality of client requests executed by said at least one of the first server and the second server, wherein each reply comprises the identifier assigned to its corresponding client request, and wherein the ones of the plurality of client requests executed by the first server and the second server are periodically identified by updating a current identifier stored in a shared memory shared between the first server and the second server; and in response to the first server failing, the second server executing at least one client request of the plurality of client requests that has not been executed by the first server, the at least one client request being determined based on the current identifier stored in the shared memory;

wherein, for a given one of the plurality of client requests, a first reply comprising given identifier is sent from the first server prior to the first server failing and a second reply comprising the given identifier is sent from the second server subsequent to the first server failing, and further comprising providing a first one of the first reply and the second reply to a source client device that is a source of the given client request, identifying a second one of the first reply and the second reply as a redundant reply based on the given identifier, and refraining from providing the second one of the first reply and the second reply to the source client device.

13. The method of claim 12, wherein the first server and the second server comprise web servers.

14. The method of claim 12, wherein the shared memory comprises a coupling facility.

15. The method of claim 12, further comprising varying a frequency associated with periodically updating the current identifier stored in the shared memory in response to available computing resources.

16. The method of claim 15, wherein the computing resources comprise at least one of a processor comprising the cluster of servers and network bandwidth between the first server and the shared memory.

17. A system comprising:
a first server of a cluster of servers configured to receive a plurality of client requests and to attempt to execute each client request in the plurality of client requests, wherein each of the plurality of client requests is assigned an identifier, wherein the plurality of client requests comprising two or more client requests from a given client device, wherein individual ones of the two or more client requests from the given client device are assigned different identifiers;

a second server of the cluster of servers receiving the plurality of client requests and storing the plurality of client requests before failure of the first server; and a shared memory shared between the first server and the second server;

wherein the one or more client requests executed by the first server and the second server are periodically identified by updating a current identifier stored in the shared memory;

wherein, in response to the first server failing, the second server is configured to determine at least one client request in the plurality of client requests that has not been executed by the first server based on the current identifier stored in the shared memory and to execute the at least one client request that has not been executed by the first server;

wherein each of the first server and the second server sends at least one reply corresponding to each executed client request, each reply comprising the identifier assigned to its corresponding client request;

wherein, for a given one of the plurality of client requests, a first reply comprising a given identifier is sent from the first server prior to the first server failing and a second reply comprising the given identifier is sent from the second server subsequent to the first server failing, the system being configured to provide a first one of the first reply and the second reply to a source client device that is a source of the given client request, to identify a second one of the first reply and the second reply as a redundant reply based on the given identifier, and to refrain from providing the second one of the first reply and the second reply to the source client device.

18. The system of claim 17, wherein the first server and the second server comprise web servers.

19. The system of claim 17, wherein the shared memory comprises a coupling facility.

20. The method of claim 1, wherein the given identifier in the first reply and the second reply indicates partial completion of the given client request.

\* \* \* \* \*